United States Patent [19]

Dal Palû

[11] Patent Number: 5,267,757
[45] Date of Patent: Dec. 7, 1993

[54] CONNECTION ASSEMBLY FOR VEHICLE ENGINE COOLANT CIRCUITS

[75] Inventor: Attilio Dal Palû, Rivoli, Italy

[73] Assignee: Fabbrica Italiana Serrature Torino S.p.A., Torino, Italy

[21] Appl. No.: 712,148

[22] Filed: Jun. 6, 1991

[30] Foreign Application Priority Data

Jun. 8, 1990 [IT] Italy .................. 53079 8/90

[51] Int. Cl.$^5$ .................. F16L 55/00
[52] U.S. Cl. .................. 285/175; 285/319; 285/331; 285/292; 285/921; 285/423; 285/320
[58] Field of Search .......... 285/319, 320, 921, 175, 285/331, 292, 423

[56] References Cited

U.S. PATENT DOCUMENTS

| | | |
|---|---|---|
| 3,394,954 | 7/1968 | Sarns .................. 285/319 |
| 4,747,621 | 5/1988 | Gans et al. .................. 285/921 X |
| 4,775,173 | 10/1988 | Sauer .................. 285/921 X |
| 4,844,512 | 7/1989 | Gahwiler .................. 285/921 X |
| 5,078,429 | 1/1992 | Braut et al. .................. 285/320 X |

FOREIGN PATENT DOCUMENTS

| | | | |
|---|---|---|---|
| 275749 | 7/1988 | European Pat. Off. .................. 285/319 |
| 2077377 | 12/1981 | United Kingdom .................. 285/319 |

Primary Examiner—Dave W. Arola
Attorney, Agent, or Firm—Gifford, Groh, Sprinkle, Patmore and Anderson

[57] ABSTRACT

A connection assembly for vehicle engine coolant circuits, wherein a tubular element is connected to a branch pipe via snap-on connecting means and fluid-tight sealing means located between the tubular element and the branch pipe and supported on respective tubular bodies. The snap-on connecting means comprise two projecting portions supported on diametrically-opposed appendixes on the first tubular body, and designed to fit partially inside a respective annular groove formed on the other tubular body.

10 Claims, 4 Drawing Sheets

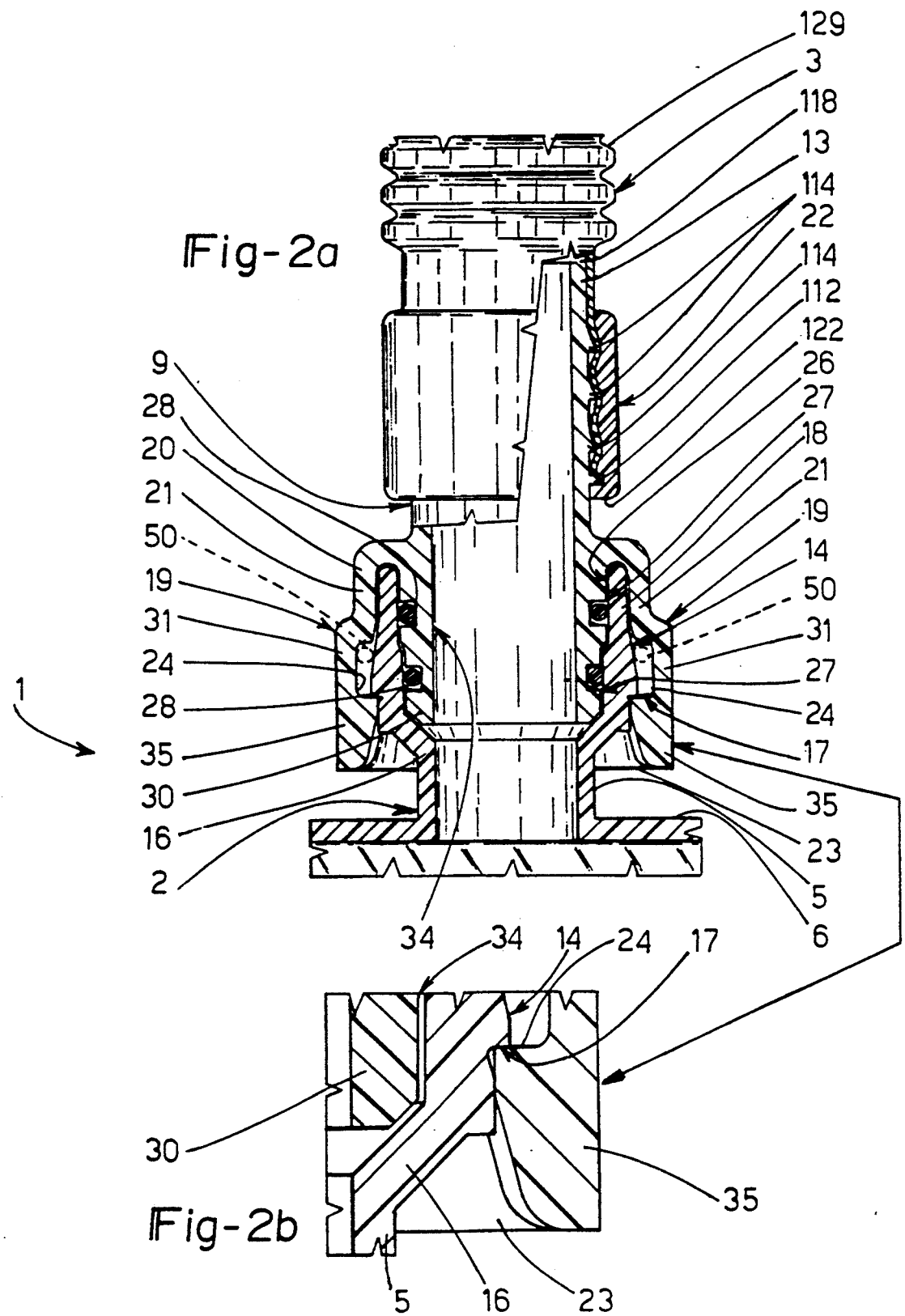

CONNECTION ASSEMBLY FOR VEHICLE ENGINE COOLANT CIRCUITS

BACKGROUND OF THE INVENTION

The present invention relates to a connection assembly for vehicle engine coolant circuits.

Known circuits of the aforementioned type usually feature rubber hoses, the end portions of which are connected firmly to other parts or distributor assemblies on the cooling system by means of metal clamps opened and closed by means of a tool, usually a screwdriver.

Connections of the aforementioned type present several major drawbacks: eventual aging of the hoses results in a loss of elasticity, in turn accompanied by a variation in the hose section, and in cracking so that the pressure exerted by the clamp is no longer sufficient for ensuring fluidtight sealing between the hose and the element to which is connected.

The presence of acid vapors, combined with the high temperature inside the engine compartment of the vehicle, results in corrosion and possible damage of the clamps, thus further impairing sealing performance. Moreover, when corroded, the metal clamps are difficult to remove or replace due to corrosion and jamming of the opening and closing mechanism.

SUMMARY OF THE INVENTION

It is an object of the present invention to provide a connection assembly designed to overcome the aforementioned drawbacks associated With the use of clamps, i.e. which provides for fast, tool-free assembly of the hose; troublefree removal; and no impairment in sealing performance.

According to the present invention, there is provided a connection assembly for vehicle engine coolant circuits, comprising at least one tubular element connectable to at least one branch pipe; characterized by the fact that it comprises snap-on connecting means and fluidtight sealing means between said tubular element and said branch pipe.

BRIEF DESCRIPTION OF THE DRAWINGS

Two preferred, non-limiting embodiments of the present invention will be described by way of example with reference to the accompanying drawings, in which:

FIG. 2 shows a partially-sectioned side view, with a larger-section detail, of the FIG. 1 elements connected together;

DETAILED DESCRIPTION OF THE INVENTION

Figure 1:
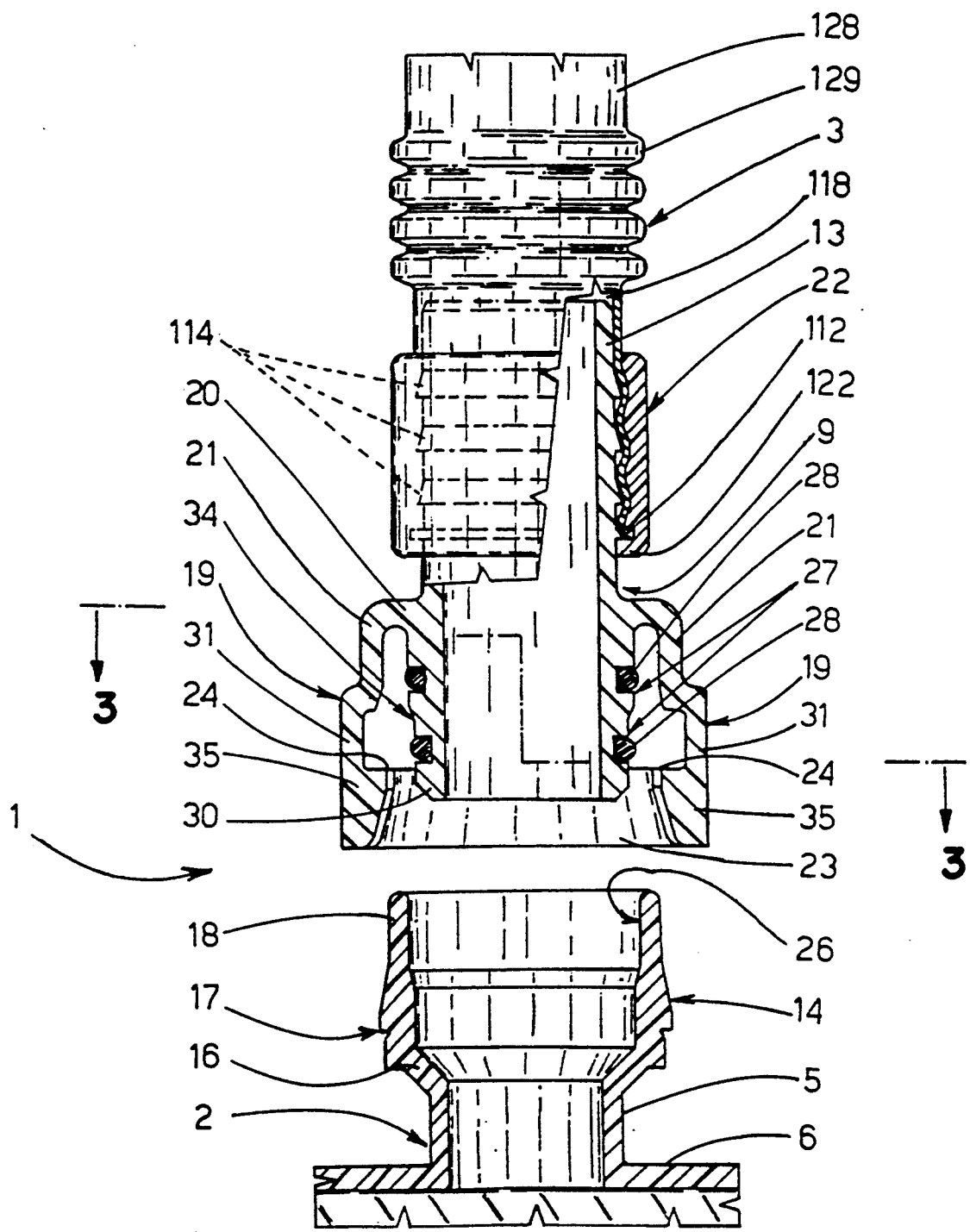
FIG. 1 shows a disconnected, partially-sectioned side view of two elements forming part of a connection assembly in accordance with the teachings of the present invention.

Number 1 in FIG. 1 indicates a connection assembly for vehicle engine coolant circuits, comprising a first tubular fitting body 2 designed to snap on to a second tubular fitting body 9 on a branch pipe 3, both said tubular bodies 2 and 9 conveniently being made of plastic material, such as nylon.

Said first tubular body 2 presents a portion 5 extending from portion 6 of a component element of the coolant circuit, e.g. a portion of the radiator and having a front tubular end portion 14 designed to snap on to said second tubular body 9 as described later on.

Front tubular portion 14 is larger in diameter than portion 5, with which it is blended by means of a truncated-cone-shaped wall 16. Towards the bottom, portion 14 defines an outer annular shoulder 17 and presents a thinner front portion 18 defining a shaped tubular inner cavity 26.

Said second tubular body 9 presents a first tubular portion 13 having an outside diameter equal to the inside diameter of pipe 3 and partially inserted inside an end portion of pipe 3 to which it is secured integral by means of a sealing coupling 22 formed in one piece with pipe 3. Tubular portion 13 presents an annular flange 112, the function of which will be described later on, and three annular, truncated-cone-shaped projections 114 spaced between annular flange 112 and end edge 118 of tubular portion 13 and increasing in section towards flange 112.

The front end edge of pipe 3 is arranged contacting flange 112.

Tubular coupling 22 is conveniently made of plastic molded in one piece on the portion of pipe 3 fitted to tubular portion 13 of tubular body 9, so as to secure pipe 3 to annular projections 114. Tubular coupling 22 also presents an end portion 122 formed in one piece on a short portion of the exposed part of tubular portion 13, beyond annular flange 112, so as to prevent coupling 22 from sliding in relation to tubular portion 13 and withdrawal of pipe 3.

Pipe 3 conveniently presents a number of continuous smooth portions 128 and undulated portions 129 forming respectively rigid and flexible portions, for conveniently routing the coolant circuit between the various components inside the engine compartment.

Pipe 3 may be a single-walled type, conveniently made of plastic (as shown), or comprise a first inner wall and a second outer wall integral with each other and made of different materials, e.g. polyethylene and nylon respectively.

Figure 4:
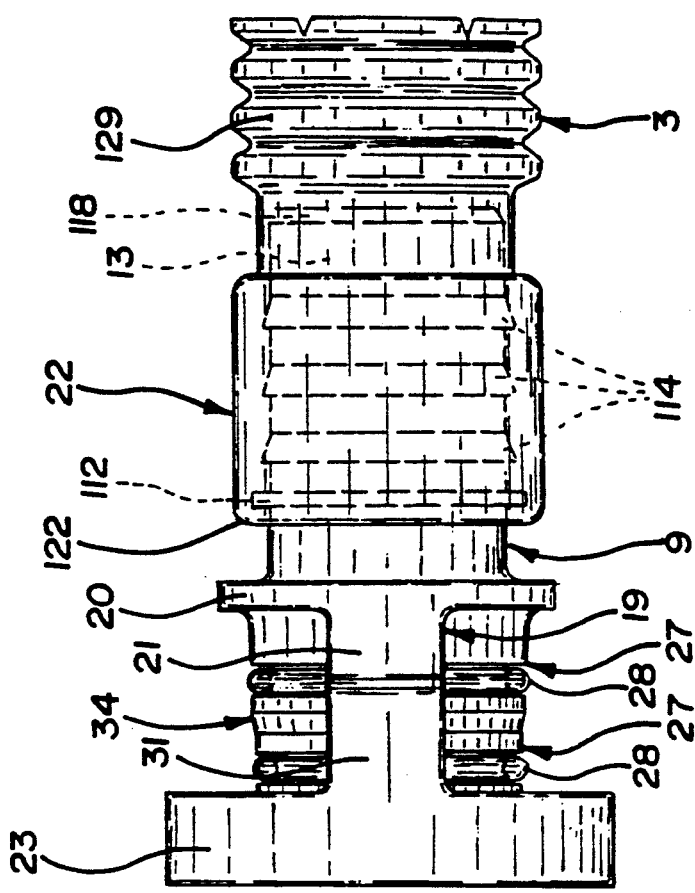
FIG. 4 shows a side view of one of the FIG. 1 elements.
Figure 3:
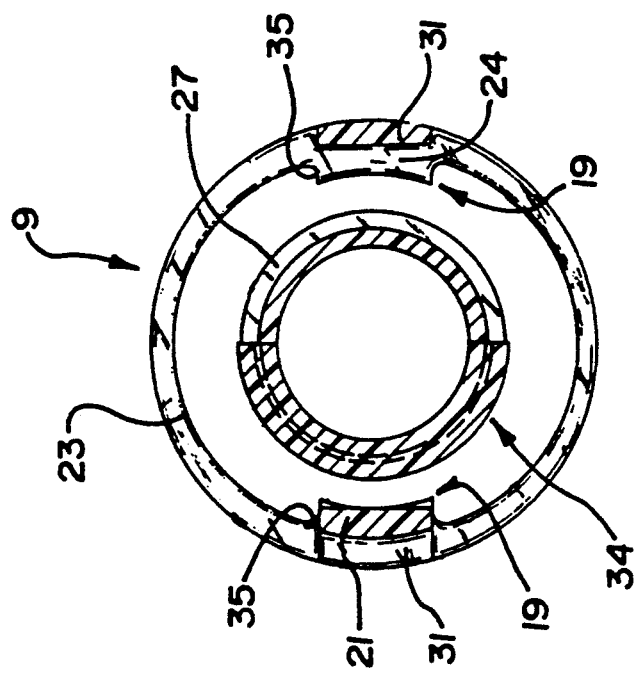
FIG. 3 shows a section along line III—III of one of the FIG. 1 elements.

As shown more clearly in FIGS. 3 and 4, tubular body 9 is formed in one piece with two flexible, diametrically-opposed appendixes or skirt 19 extending from an outer annular portion 20 on an intermediate portion of tubular body 9. Appendixes 19 present a first portion 21 parallel to body 9; a more radially-outward second portion 31 also parallel to body 9; and an annular end body 23 annularly separated from the front end edge 30 of a tubular front portion 34 of body 9.

At appendixes 19, annular body 23 presents two larger-section substantially trapezoidal portions 35, the longer side of which defines a respective wall 24 mating, as described later on, with shoulder 17 for enabling snap-on connection of tubular bodies 2 and 9. Front portion 34 of body 9 presents a gradually decreasing section and an outer contour of substantially the same shape as inner tubular cavity 26 defined by tubular portion 14, with which it is designed to mate. The outer surface of portion 34 also presents two annular, rectangular-section grooves 27 engaged by respective fluidtight sealing rings 28.

In use, for connecting tubular bodies 2 and 9 as shown in FIG. 2, tubular front portion 14 of body 2 is inserted between annular body 23 and tubular front portion 34 of body 9, which is pushed towards body 2 so that portion 34 fits inside cavity 26.

As body 2 is inserted inside body 9, as described above, annular body 23 is flexed by the pressure exerted by portion 14 perpendicular to the insertion direction. Portion 14 is allowed to slide in relation to portion 34 until front edge 18 of portion 14 contacts outer annular portion 20 of tubular body 9, in which position, portions 35 snap on to portion 14 by virtue of walls 24 pressing on shoulder 17, thus ensuring stable connection of bodies 2 and 9.

In the above position, the inner surface of cavity 26 of portion 14 also presses on sealing rings 28, thus providing for fluidtight connection.

To disconnect tubular bodies 2 and 9, the two arms (numbered 50 and shown by the dotted line in FIG. 2) of a forked tool (not shown) are inserted in the gaps between portion 14 and portions 31 of flexible appendixes 19, and widened (e.g. by inserting the tool further, in the case of inclined arms 50) so as to radially flex annular body 23, detach walls 24 from shoulder 17, and so snap free bodies 2 and 9, at which point, body 9 is withdrawn from body 2 so as to remove front portion 34 from cavity 26.

Figure 6:
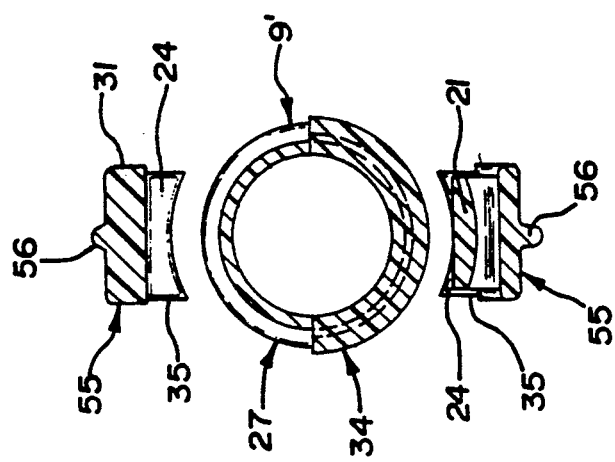
FIG. 6 shows a section along line VI—VI of the FIG. 5 element.
Figure 5:
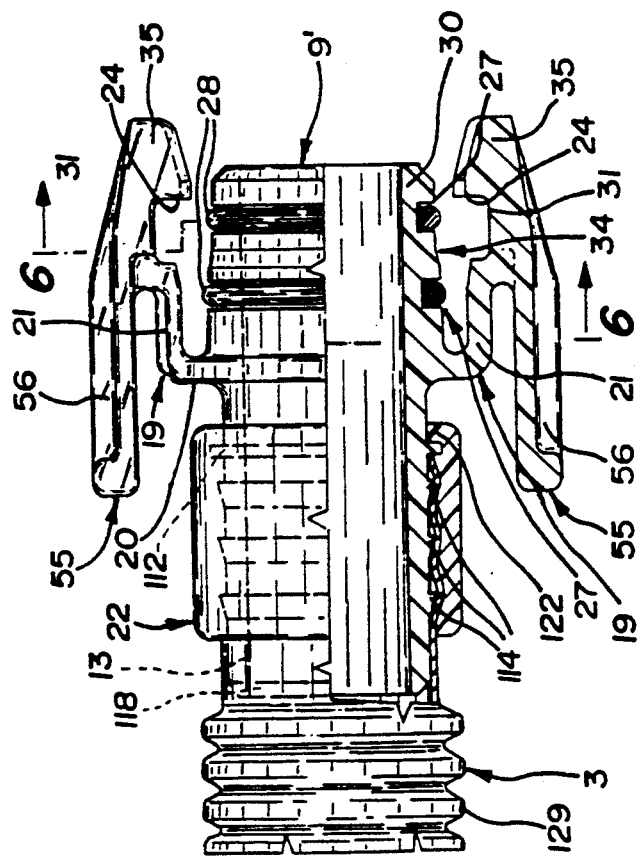
FIG. 5 shows a side view of a variation of the FIG. 4 element.
Figure 7:
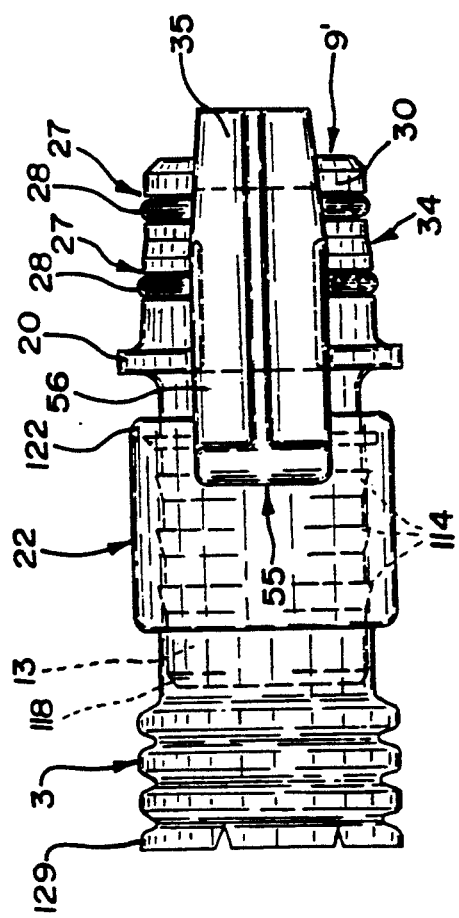
FIG. 7 shows a perpendicular side view of the FIG. 5 element.

FIGS. 5 to 7 show a variation of tubular body 9, indicated 9', wherein annular body 23 is eliminated, and the now free ends of the two flexible appendixes 19 present only portions 35. At portions 31 of flexible appendixes 19, respective rectangular-section tabs 55 with a longitudinal axial rib 56 extend integrally outwards in the opposite direction to portions 35 and parallel to tubular body 9'.

Tubular bodies 2 and 9' are connected in substantially the same way as tubular body 9 in FIGS. 1 to 4.

Instead of using a forked tool, however, bodies 2 and 9' are disconnected by pressing the ends of tabs 55 towards the center of body 9', so as to move portions 35 outwards of the axis of body 9', release walls 24 from shoulder 17, and so snap free bodies 2 and 9'.

The connection assembly according to the present invention clearly provides, therefore, for overcoming the drawbacks associated with known devices, in particular, by providing for fast, troublefree snap-on connection of tubular bodies 2 and 9 or 9', with no tools required for connection and, in the case of tubular body 9', not even for release. Moreover, it provides for excellent sealing by virtue of the relatively long connecting portion between front portions 14 and 34, which is further enhanced by sealing rings 28. Finally, being made of plastic, tubular bodies 2 and 9 or 9' are no longer subject to the wear and corrosion typically associated with metal clamps employed on known connection assemblies.

To those skilled in the art it will be clear that changes may be made to the assembly as described and illustrated herein without, however, departing from the scope of the present invention. For example, changes may be made to the number of connecting portions or the design and arrangement of said snap-on connecting means or to the hydraulic circuit components connected to tubular bodies 2 and 9 or 9'. For example, tubular body 2 may also be connected to a pipe in the same way as tubular body 9 to pipe 3 or element 6 may be a portion of a tubular multiway distributing element.

I claim:

1. A connection assembly for vehicle engine coolant circuits, comprising at least one tubular element having snap-on connecting means; and at least one branch pipe connected to said tubular element;

said connecting means comprising a male tubular body on said tubular element having sealing means extending about the perimeter of said male body and a coaxial skirt surrounding said male tubular body and enclosing said male tubular body;

a female tubular body having a shoulder extending about the perimeter of said female body;

wherein said skirt defines an area for receiving said female tubular body;

said skirt further comprising a flexible member being displaceable inwardly for engaging and releasing said shoulder of said female tubular body; and a connecting element;

wherein said tubular element is connected to said branch pipe by said connecting element molded about said tubular element and said branch pipe to permanently mount said tubular element to said branch pipe.

2. A connection assembly as claimed in claim 1 wherein said snap-on connecting means comprises at least one projection on the flexible member of said skirt which engages the shoulder on said female tubular body.

3. A connection assembly as claimed in claim 2, wherein between said male tubular body and said coaxial skirt there is formed a gap for receiving said female tubular body in which is formed a cavity adjacent said shoulder for receiving said projection.

4. A connection assembly as claimed in claim 3, wherein said sealing means is housed between said male and female tubular bodies.

5. A connection assembly as claimed in claim 2 wherein said snap-on connecting means comprises at least two projections on the flexible member of said skirt which engage the shoulder on said female tubular body.

6. A connection assembly as claimed in claim 5 wherein said two projections are diametrically opposed.

7. A connection assembly as claimed in claim 5, wherein said projections present respective tabs moved manually in relation to the axis of said tubular element for releasing said female tubular body.

8. A connection assembly as claimed in claim 5, wherein said flexible member is an elastically deformable annular body; said annular body being coaxial with said tubular element and separated diametrically from said male tubular body.

9. A connection assembly as claimed in claim 1, wherein said tubular element and said female tubular body are made of plastic.

10. A connection assembly as claimed in claim 1, wherein said branch pipe comprises a number of continuous smooth portions and undulated portions forming respective rigid and flexible portions.

* * * * *